United States Patent
Günther et al.

(10) Patent No.: US 10,843,577 B2
(45) Date of Patent: Nov. 24, 2020

(54) BATTERY HOUSING

(71) Applicant: Kirchhoff Automotive Deutschland GmbH, Attendorn (DE)

(72) Inventors: Alexander Günther, Olpe (DE); Marco Töller, Cologne (DE); Stefan Brandl, Mitterteich (DE); Alexander Schauerte, Kirchhundem (DE)

(73) Assignee: KIRCHHOFF AUTOMOTIVE DEUTSCHLAND GMBH, Attendorn, DE (US)

( * ) Notice: Subject to any disclaimer, the term of this patent is extended or adjusted under 35 U.S.C. 154(b) by 0 days.

(21) Appl. No.: 16/330,690

(22) PCT Filed: Oct. 12, 2017

(86) PCT No.: PCT/EP2017/076122
§ 371 (c)(1),
(2) Date: Mar. 5, 2019

(87) PCT Pub. No.: WO2018/082896
PCT Pub. Date: May 11, 2018

(65) Prior Publication Data
US 2019/0381899 A1    Dec. 19, 2019

(30) Foreign Application Priority Data
Nov. 2, 2016 (DE) .................. 10 2016 120 826

(51) Int. Cl.
*B60L 50/64* (2019.01)
*H01M 2/10* (2006.01)
*B60K 1/04* (2019.01)
(52) U.S. Cl.
CPC ............ *B60L 50/64* (2019.02); *B60K 1/04* (2013.01); *H01M 2/1083* (2013.01)

(58) Field of Classification Search
CPC ......... B60L 50/64; B60K 1/04; H01M 2/1083
(Continued)

(56) References Cited

U.S. PATENT DOCUMENTS

2005/0260488 A1*  11/2005  Zhou ...................... B60R 16/04
                                                                 429/99
2010/0307848 A1   12/2010  Hashimoto et al.
(Continued)

FOREIGN PATENT DOCUMENTS

DE     202016102223 U1   5/2016
EP        2332761 A1     6/2011
(Continued)

OTHER PUBLICATIONS

International Search Report dated May 11, 2018 in parent International application PCT/EP2017/076122.
(Continued)

*Primary Examiner* — Edwin A. Leon
*Assistant Examiner* — Milagros Jeancharles
(74) *Attorney, Agent, or Firm* — Margaret Polson; Christopher Sylvain; Polson Intellectual Property Law, PC

(57) ABSTRACT

A battery case for a vehicle driven by an electric motor, said battery case comprising a tray part (1, 1.1, 1.2, 1.3) which has a base (2, 2.1, 2.2, 2.3) onto which side walls (3, 3.1, 3.2, 3.3) having a mounting flange (4) are molded, and comprising a frame structure (5, 5.1, 5.2) which surrounds the tray part (1, 1.1, 1.2, 1.3) on the outer side thereof and has a hollow chamber (11, 11.1, 11.2). The side walls (3, 3.1, 3.2, 3.3) of the tray part (1, 1.1, 1.2, 1.3) are at the same time part of the frame structure (5, 5.1, 5.2) and separate the tray interior from the hollow chamber (11, 11.1, 11.2) of the frame structure (5, 5.1, 5.2). The side walls (3, 3.1, 3.2, 3.3) with their mounting flange (4) are part of the frame structure (5, 5.1, 5.2) and the frame structure (5, 5.1, 5.2) has at least
(Continued)

two additional frame members (6, 8, 3.1, 4.1, 13, 3.2, 4.2, 13.1) connected to the tray part (1, 1.1, 1.2, 1.3) for completing the frame structure (5, 5.1, 5.2), of which a first frame member (6, 3.1, 3.2) has a leg (3, 3.1, 3.2, 6.1) which is opposite the side wall (3, 3.1, 3.2, 3.3) of the tray part (1, 1.1, 1.2, 1.3) and an upper terminating leg (4.1, 4.2, 7) for connection to the tray part (1, 1.1, 1.2), and of which a second frame member is a closing plate (8, 13, 13.1) that connects the first frame member (6, 3.1, 3.2) to the tray part (1, 1.1, 1.2) on the undersides thereof.

20 Claims, 7 Drawing Sheets

(58) Field of Classification Search
USPC .......................................................... 439/521
See application file for complete search history.

(56) References Cited

U.S. PATENT DOCUMENTS

| | | | |
|---|---|---|---|
| 2011/0143179 A1 | 6/2011 | Nakamori | |
| 2012/0103714 A1 | 5/2012 | Choi et al. | |
| 2012/0164500 A1 | 6/2012 | Loo et al. | |
| 2012/0244397 A1* | 9/2012 | Tenhouten | H01M 2/1005 429/61 |
| 2012/0261206 A1* | 10/2012 | Yasui | B60L 50/64 180/274 |
| 2015/0357606 A1 | 12/2015 | Nishimura et al. | |
| 2018/0062128 A1 | 3/2018 | Günther | |
| 2019/0036092 A1 | 1/2019 | Günther | |
| 2019/0259994 A1* | 8/2019 | Gunther | B60L 50/64 |
| 2019/0273231 A1* | 9/2019 | Gunther | H01M 2/1077 |
| 2019/0337402 A1* | 11/2019 | Gunther | B60K 1/04 |
| 2020/0180443 A1* | 6/2020 | Frost | B23K 11/185 |

FOREIGN PATENT DOCUMENTS

| | | |
|---|---|---|
| EP | 2623353 A1 | 8/2013 |
| EP | 2916369 A1 | 9/2015 |
| JP | 2011023230 A | 2/2011 |
| WO | 2015151866 A1 | 10/2015 |

OTHER PUBLICATIONS

International Preliminary Report on Patentability dated Dec. 28, 2018 in parent International application PCT/EP2017/076122.

U.S. Appl. No. 16/320,060, filed Jan. 23, 2019, applicant Kirchhoff Automotive Deutschland GmbH. Per Rule 609.07, copy not provided as this is available in the USPTO system.

U.S. Appl. No. 16/320,207, filed Jan. 24, 2019, applicant Kirchhoff Automotive Deutschland GmbH. Per rule 609.07, copy not provided as this is available in the USPTO system.

U.S. Appl. No. 16/320,063, filed Jan. 23, 2019, applicant Kirchhoff Automotive Deutschland GmbH. Per rule 609.07, copy not provided as this is available in the USPTO system.

U.S. Appl. No. 16/329,47, filed Feb. 28, 2019, applicant Kirchhoff Automotive Deutschland GmbH. Per rule 609.07, copy not provided as this is available in the USPTO system.

* cited by examiner

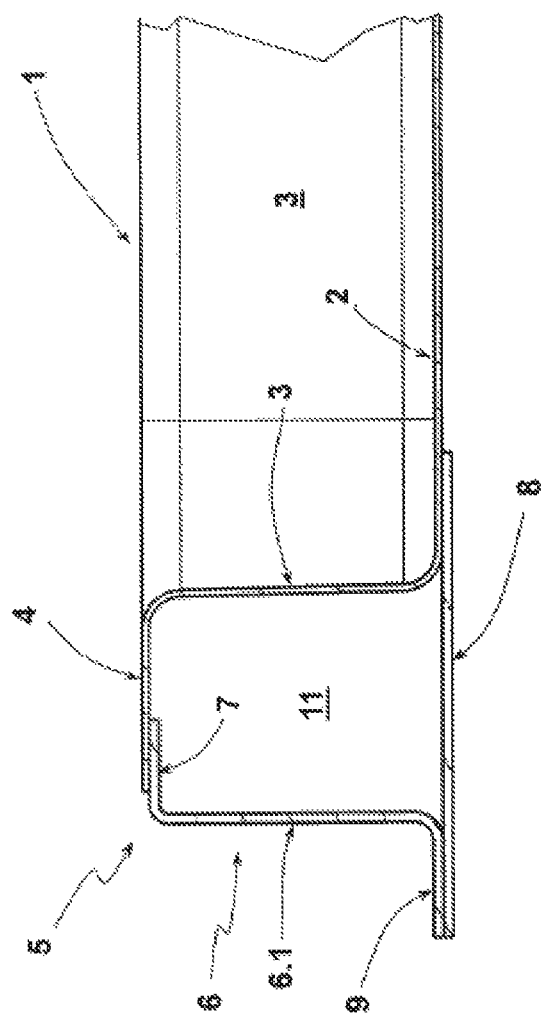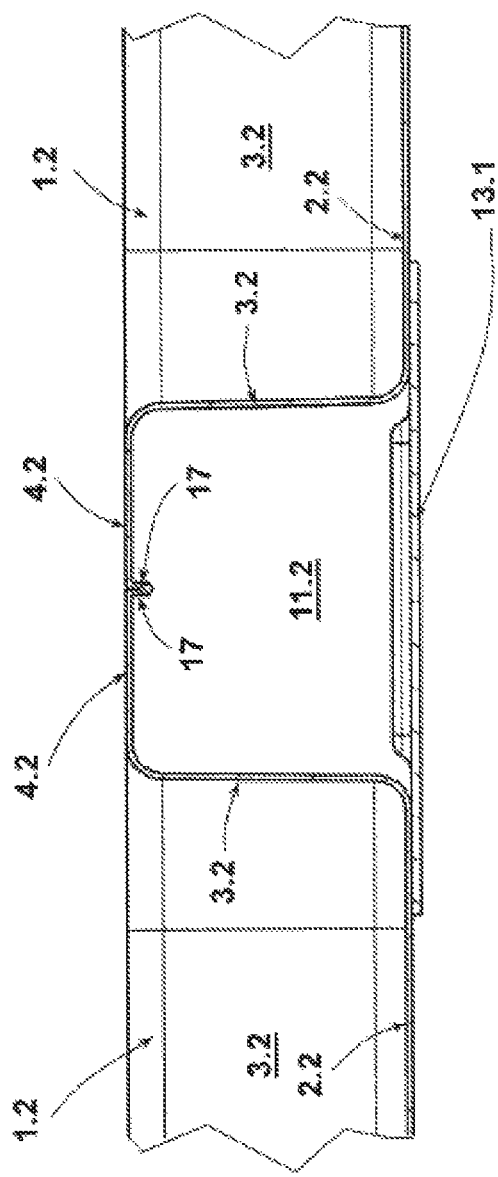

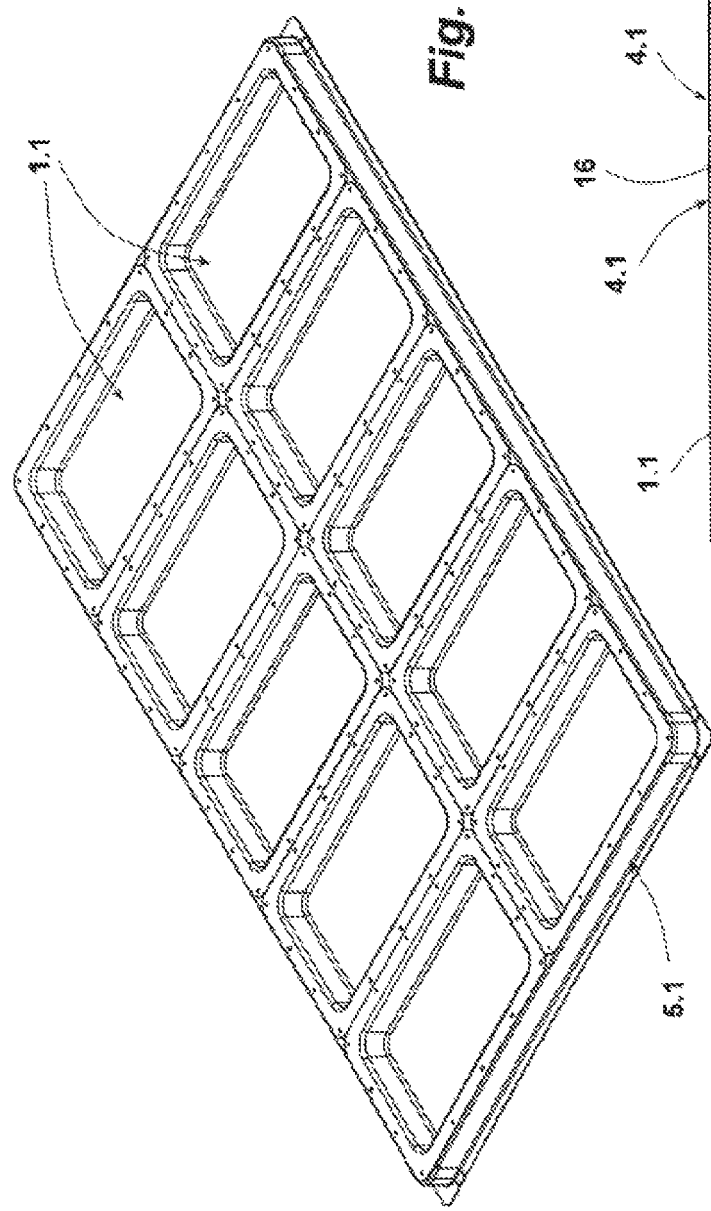
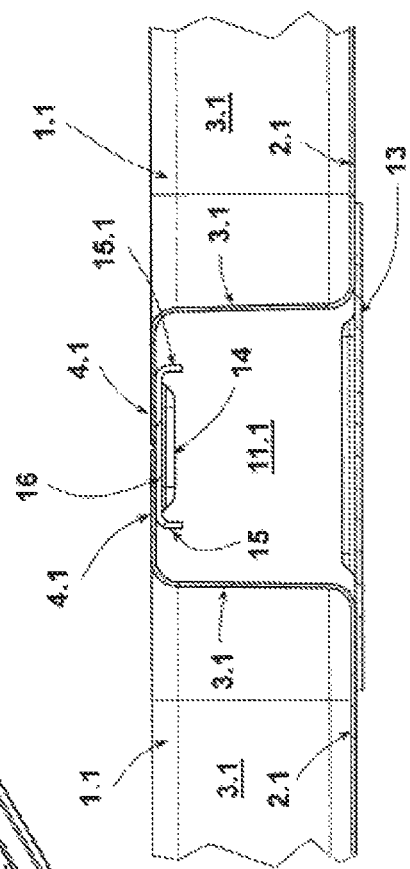

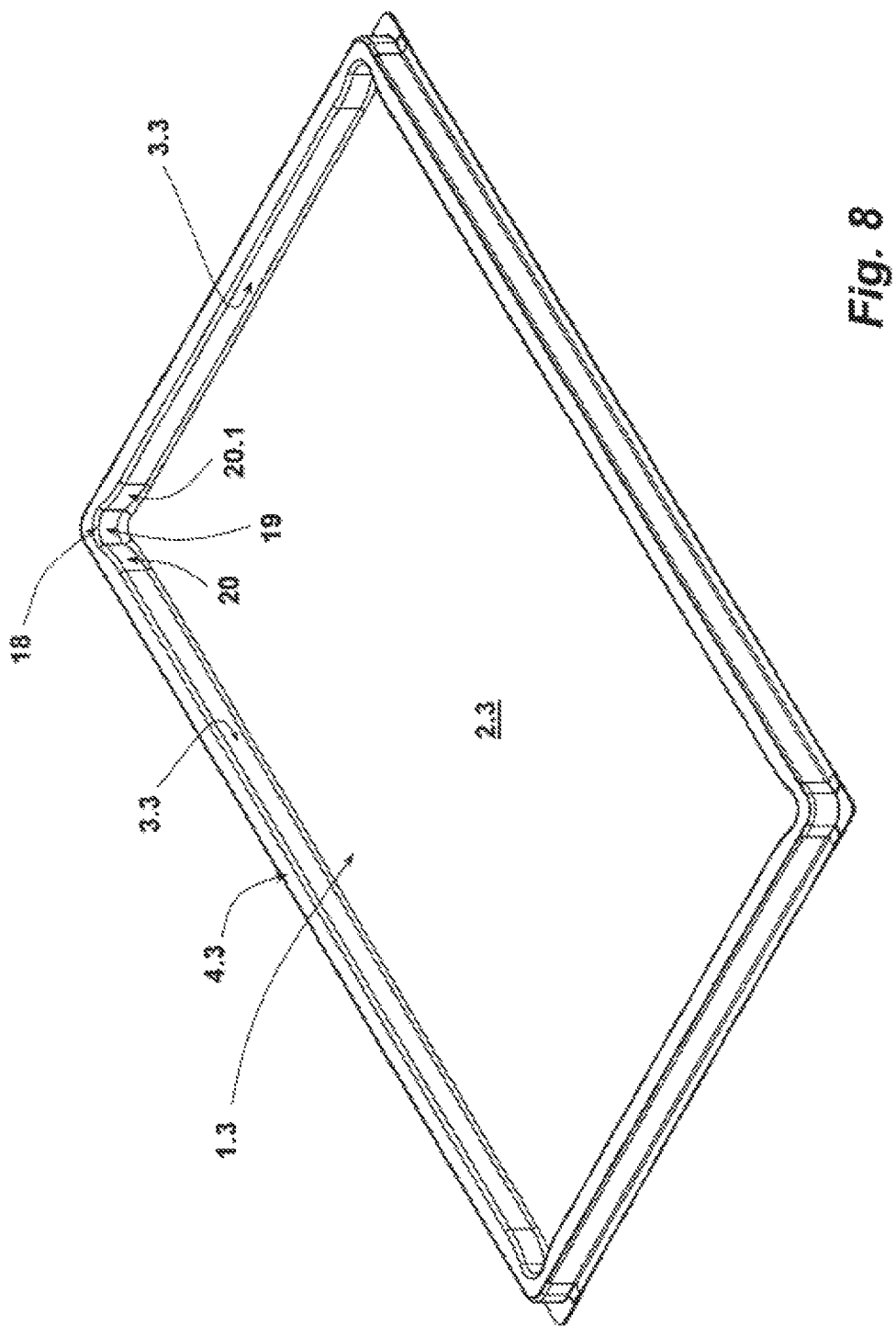

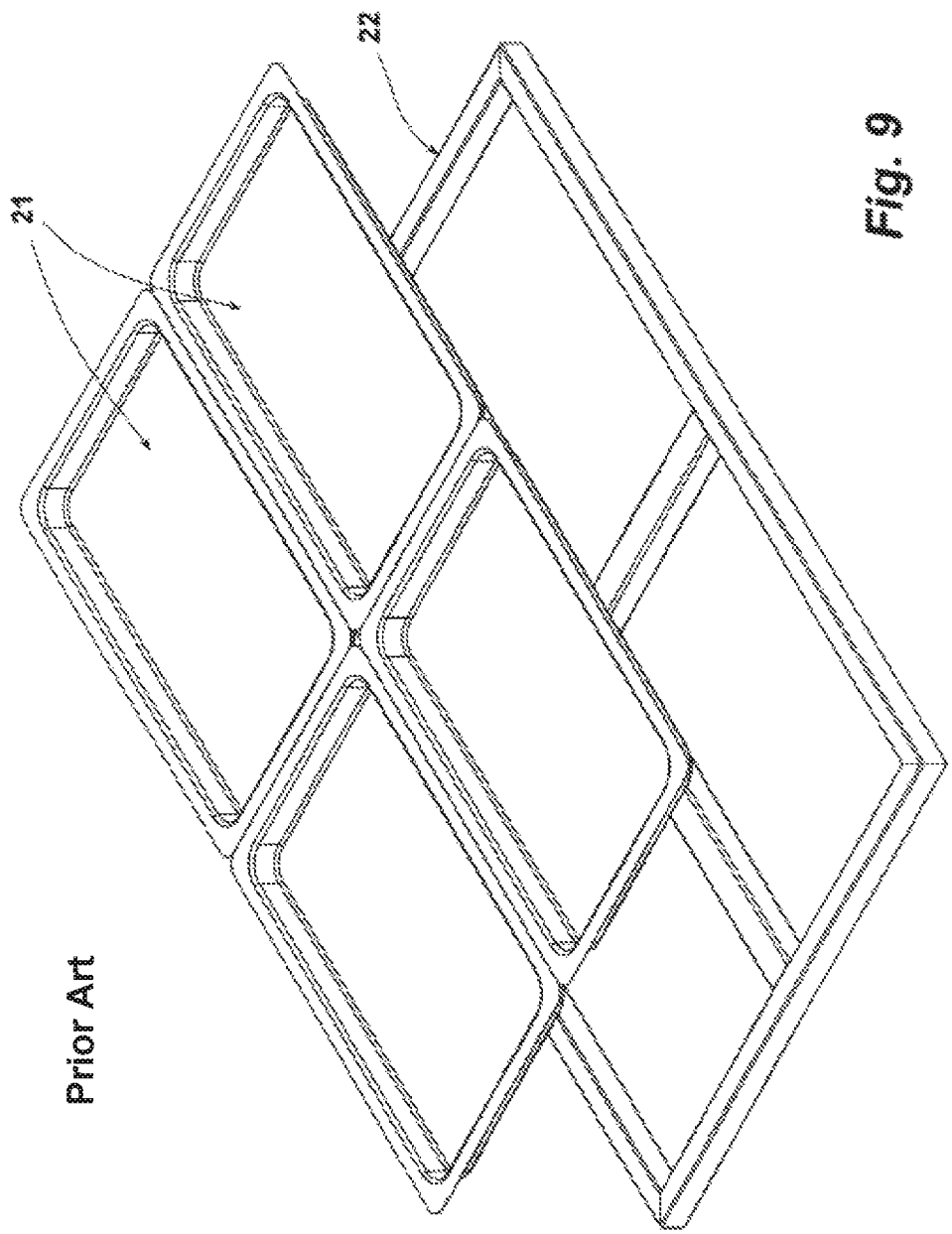

BATTERY HOUSING

BACKGROUND

The present disclosure relates to a battery case for a vehicle driven by an electric motor, wherein the battery case comprises: a tray part, which has a base onto which side walls with a mounting flange are molded, and a frame structure that surrounds the tray part on the outer sides thereof and has a hollow chamber, with the side walls of the tray part also acting as part of the frame structure, thereby separating the interior of the tray from the hollow chamber of the frame structure.

In vehicles that are driven by an electric motor, such as automobiles, industrial trucks, or the like, battery modules are used as energy storage devices. Battery modules of this type are typically composed of a plurality of individual batteries. These batteries are known as high-voltage batteries. Housing these types of battery modules, that are required to operate such a vehicle, is subject to certain requirements. It is essential for the battery module or modules to be protected in their battery case from external influences. In addition, the battery module or modules must be housed in a moisture-sealed battery case to prevent condensation within the battery case. Moisture entering the battery chamber of the battery case may lead to a short circuit, which could ignite a fire inside the battery module.

DE 20 2016 102 223 U1 discloses a battery case which has a tray part and a cover part detachably connected to the tray part. Each of the two parts has an outwardly projecting, peripheral mounting flange on its sides that face the other of the parts. Arranged between the tray part and the cover part is a peripheral seal. The two parts are connected to one another by screw fasteners, so that the interior of the battery case is sealed.

Such a battery case is surrounded by a frame structure to comply with the safety requirements imposed for use in a vehicle.

In many cases, the frame structure is composed of a plurality of extruded light metal hollow chamber profile sections. Light metal extruded profile sections, typically made of an aluminum alloy, are often used for these purposes due to their low weight. In addition, if a suitable alloy is selected, the extruded profile sections can also have shock absorbing properties. For cost and stability purposes, however, the battery cases of the type described above are more preferably made from steel blanks by means of a deep drawing process. The frame structure formed from the extruded profile sections is arranged bordering the mounting flange and the adjacent side wall of the tray part. Due to the different materials that are used, particular care must be exercised in joining the frame structure to the tray part by welding. A welded connection is preferred because the use of additional fasteners would in turn increase the weight of the battery case.

Rectangular hollow chamber sections are used to form the frame structure. The side wall of the tray part is inclined somewhat due to design requirements necessary for the purpose of demolding. Thus, the extruded sections that form the frame structure adjoin the side wall only at the point of direct transition between the mounting flange and the side wall. In the event of an impact on the frame structure, this impact will be introduced into the tray part in the upper portion of the side wall, so that there is a risk of indentation in the upper region of the side wall. One such battery case is known from US 2011/01431.79 A1.

A battery case is also known from US 2012/0164500 A1. The side walls of the tray part of this disclosure is made of a thermosetting resin having outwardly projecting flanges. The cover part is similarly produced. The two parts, tray part and cover part, with their upper flange surfaces adjoining one another, are held together by means of a mounting clamp consisting of two parts, of which one part is supported on the upwardly facing flange side of the cover part and the other part is supported on the bottom of the tray part. This clamp surrounds the tray part entirely. However, this is not necessarily a frame structure since the clamp parts are held together in a clamping closure with only the tray part and the cover part. Finally, the clamp serves the purpose of pressing the cover part with preloading force against the tray part. This clamping closure is intended to be maintained even under tensile forces acting on the clamp frame. Projections of the cover part are used for this purpose. These block removal of the clamp frame from the intended clamping position.

US 2010/0307848 A1 discloses a tray part for a battery case. The tray part has outwardly bent mounting flanges at the upper terminations of the side walls. The cover is fastened to these by means of mounting clamps that encompass the mounting flanges. A peripheral reinforcement frame is attached on the outer side of the side wall of the tray part. Said frame serves to lend rigidity to the battery case. The frame is formed by an asymmetrically designed, U-shaped sheet metal part having one longer leg which engages beneath the base of the tray part and one outwardly bent shorter leg, which is connected to the outer side of the side wall of the tray part. The lower half of the side wall is thereby integrated into the formation of the frame profile, so that a frame structure is created.

US 2015/0357606 A1 discloses a battery case, the tray part of which holds a foam core between the inner surface of said tray part and a correspondingly bent reinforcement part. The reinforcement part and the inner wall of the tray part create a cavity, in which the foam part is arranged. This assembly does not constitute a frame structure that is arranged on the outside of the tray part, as is required with the subject matter of the claimed battery case.

US 2012/0103714 A1 discloses a battery case with a profiled tray plate. The tray part is completed by a second component. The two components are connected to one another by cross-members and form a box-shaped base. The components form thickened side walls of the tray part and thus an outer peripheral chamber lined with a foam for the purpose of absorbing shocks. The two tray parts are made from a thermosetting plastic. The frame structure of this prior art battery case differs significantly from what, is claimed. The side walls do not support, mounting flanges, and the frame structure is not composed of at least two additional frame members, in addition to the side walls.

JP 2011 023230 A describes a battery case in which the side walls have no mounting flange.

WO 2015/151866 A1 discloses a support structure to which rechargeable batteries can be connected. This rack located in a housing has no frame structure.

SUMMARY

Proceeding from the foregoing an aspect of the present disclosure is therefore to further develop a battery case of the type mentioned above such that the transmission of force is improved when a shock is received, and such that the weight of said battery case is reduced, even when steel components are used to produce the frame structure.

This aspect may be achieved according to the present disclosure by a generic battery case as mentioned above, wherein: the side walls with their mounting flange are part of the frame structure, and in which the frame structure has at least two additional frame members, connected to the tray part to complete the frame structure, of which a first frame member has a leg opposite the side wall of the tray part and an upper terminating leg for connection to the tray part, and of which a second frame member is a closing plate that connects the first frame member to the tray part on the undersides thereof.

In this embodiment, the side walls of the tray part of the battery case form part of the frame structure at the same time. If the tray part is equipped with an outwardly projecting mounting flange, this also forms part of the frame structure. Since at least the side walls of the tray part already make up part of the frame structure, it is not necessary for a self-contained hollow chamber profile to be used and connected to the tray part in order to complete the frame structure toward the outside. Instead, using the portions that are provided by the tray part, only those walls or wall sections that are required to form a hollow chamber profile are needed to complete the frame structure. For this purpose, in addition to the side walls and the mounting flange of the tray part, the frame structure comprises at least two additional frame members, which are rigidly connected to the tray part. The side walls of the tray part thus serve to delimit the tray interior and thus the tray part volume. In addition, the side walls serve to delimit the hollow chamber created by the frame structure. The side walls thus serve to separate the above-described volumes. To form the frame structure in the case of a tray part, an outwardly protruding mounting flange is typically molded on the side walls at the upper ends and the other frame member can basically be an L-shaped profiled frame member, one leg being fastened to the mounting flange and the other fastened in the region of the lower termination of the tray part, for example beneath its base. Thus, in contrast to the conventional design, such a frame member has only two walls or legs. If a greater width of the frame structure is provided, such a frame member may be U-shaped. If a mounting leg is provided on the tray part, the leg of such a U-shaped profiled frame member to be connected thereto is then significantly shorter than the leg to be connected to the lower termination of the tray part. With such a configuration, half of the contour of the hollow chamber can thus be provided by the outside of the already existing tray part. This forms the basis for the substantial weight savings that can be realized with this design.

Another aspect of the present disclosure is that the frame structure is composed of at least two frame members, with one of these frame members being provided by the tray part. This enables the hollow chamber of the frame structure to be used to house functional elements, fixtures, or the like. This is not possible with hollow chambers of extruded profile sections. These fixtures may be shock absorbing elements, for example, the shock absorbing direction of which extends transversely to the longitudinal extension of the frame structure. As functional elements, reinforcement elements can also be inserted into the hollow chamber. The hollow chamber of the frame structure can also be used to house fluid conduits that are required for cooling the battery module or modules disposed in the tray interior. It is also possible for different functional elements, for example those as described above, to be housed in different sections or in the frame structure sections that extend parallel to different side walls.

The multi-part embodiment of such a frame structure also allows the individual components to be produced by different production processes. The tray part is typically a deep-drawn sheet steel component that is cost-effective to produce. The frame member or frame members used to complete the frame structure may be sheet metal sections or bent sheet metal blanks. This includes the possibility of these sheets in turn being produced by different production processes, for example processes by which different wall thicknesses can be established over the length of such an arm segment. This likewise includes the possibility of other components being connected to such an additional frame member, before the frame structure is assembled from the multiple frame members. In this respect, the connection of such additional components is simplified. For example, one or more of these additional frame members may also have beads which serve as reinforcement and/or provide fold initiation in the case of shock absorption.

Due to the above-described weight savings over conventional battery cases, the one or more frame members for completing the frame structure can likewise be sheet steel parts. These can thus be readily welded, for example by spot welds, to the tray part, which is typically likewise deep-drawn from a steel blank. In this embodiment, connection by spot welding is preferred due to the relatively low heat input, in part because there is no risk of warping of the tray part and/or the frame structure that must subsequently be corrected.

In another embodiment of such a battery case, it is provided that in a first step, a U-shaped frame structure, which is thus still open but is closed on opposing sides, is provided, after which said structure is closed off by another frame member that functions as a closing plate. Before the frame structure is closed off by the closing plate, functional elements can be easily inserted therein, including functional elements that extend between the outer surface of the side wall of the tray part and the opposing leg of a frame member.

To form the frame structure of the battery case using a plurality of frame members with the involvement of the side wall and optionally of the mounting flange of the tray part, molded onto said side wall, which elements of the tray part at the same time delimit the hollow chamber of the frame structure, it is not necessary for the contour of the tray part in the region of its side walls to match the contour of the opposite wall of the frame structure. Thus, the frame structure can be formed in the intended manner even if the side wall of the battery case has outwardly oriented bulges, for example. This can be used in a battery case in which the side walls of the tray part are connected to one another via a curved edge section and each curved edge section is connected to at least one of the side walls connected by said section with the interposition of a connector section which is curved in the opposite direction from the curved edge section. With such a corner formation, the usable volume provided by the tray part for the arrangement of one or more battery modules can be increased by about 10% over that of conventional corner designs. This is significant for the battery volume to be accommodated.

In another embodiment both of the side walls connected by an edge section are connected to said section with the interposition of a connecting wall section which is curved in the opposite direction from the edge section. This ensures that the width of the mounting flange in the region of the corner formations is not too narrow and that a peripheral seal can still be arranged thereon.

In the present disclosure, the design of the battery case with its special frame structure also provides multiple tray parts which are grouped side by side and connected to one another to form a battery case assembly. In such a configuration, the side wall and the mounting flange typically molded thereon of the adjacent tray part serve as another frame member for completing the frame structure. Two tray parts arranged side by side, with their mutually facing side walls and the mounting flanges formed thereon, thus form a U-shaped chamber which the hollow chamber of the frame structure. The two mounting are connected to one another, for example by a connector plate arranged beneath the same. In such a configuration, a closing plate typically extends between the bases of the adjacent tray parts and constitutes an additional frame member. The formation of the frame structure at such a location may offer some advantages in terms of weight savings, since in principle, only one closing plate is required in addition to the already existing walls of the adjacent tray parts in order to form the frame structure. In such a configuration, the adjoining mounting flanges of the adjacent tray parts are welded together. This configuration is in contrast to a configuration according to previous disclosures, in which a complete extruded hollow chamber profile was arranged between two adjacent tray parts.

BRIEF DESCRIPTION OF THE DRAWINGS

The present disclosure is further described in the context of depicted embodiments, with reference to the accompanying figures. In the figures:

FIG. 3 shows a cross-sect of the frame structure of e battery case part shown in FIG. 1;

FIG. 5 shows a perspective assembly of multiple tray parts with a frame structure;

FIG. 6 shows a cross-section of the frame structure of two adjacent tray parts;

FIG. 7 shows an alternative configuration of the connection between two adjacent tray parts;

FIG. 8 shows a perspective view, corresponding to that of FIG. 1, of a further tray part of a battery case having a frame structure; and FIG. 9 shows an exploded, perspective view of a tray part with a frame structure according to the prior art.

DETAILED DESCRIPTION

A battery case for accommodating one or more battery modules for a vehicle driven by an electric motor comprises a tray part 1. The tray part 1 is sealed off by a cover part, not shown in the figures, which is typically similar in structure to tray part 1. The tray part 1 may also be sealed off by a flat cover. The tray part 1 of the embodiment shown here is a part produced from a sheet steel blank by means of a deep drawing process. It has a base 2, which acts as the support surface for the battery module or modules to be accommodated therein.

Molded onto the base 2 are side walls 3. The upper termination of the side walls 3 is formed by a mounting flange 4, which points outward away from the tray interior. The mounting flange 4 is used to connect the tray part 1 to the cover part with the interposition of a peripheral seal. In the interest of simplicity, openings for the introduction of fasteners, such as screw-type fasteners, are not shown in the figures.

Figure 1:
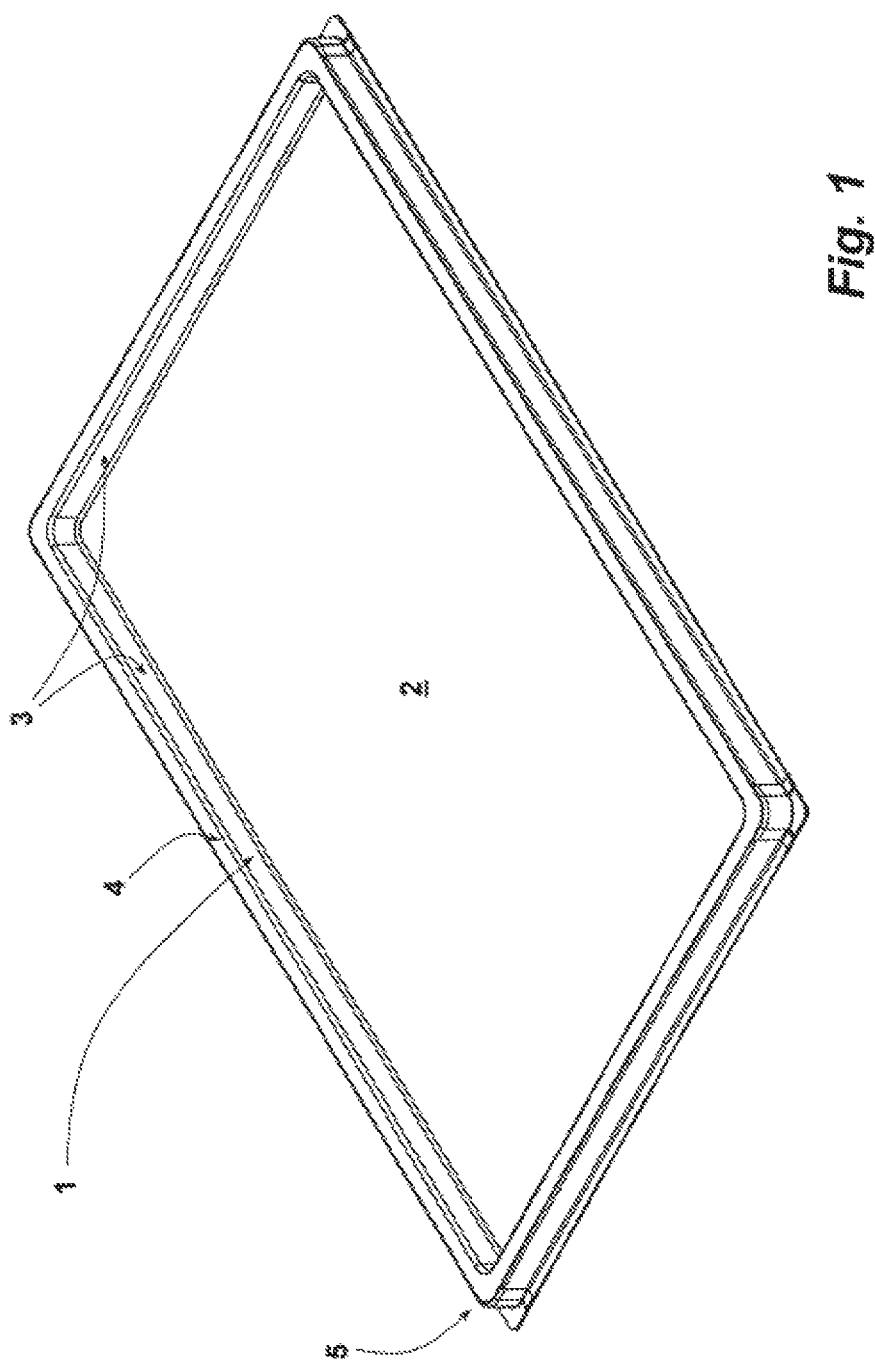
FIG. 1 shows a perspective view of a tray part with a frame structure as part of a battery case, which is otherwise not shown in detail.

In addition to the tray part 1, the battery case part shown in FIG. 1 has a frame structure 5 that surrounds the tray part 1 on the outer side thereof. The frame structure 5 encloses a hollow chamber. The frame structure 5 provides mechanical stabilization for the tray part (1) and protects the same or the battery module or modules accommodated therein against damage from the outside, for example impacts, caused by a collision.

Figure 2:
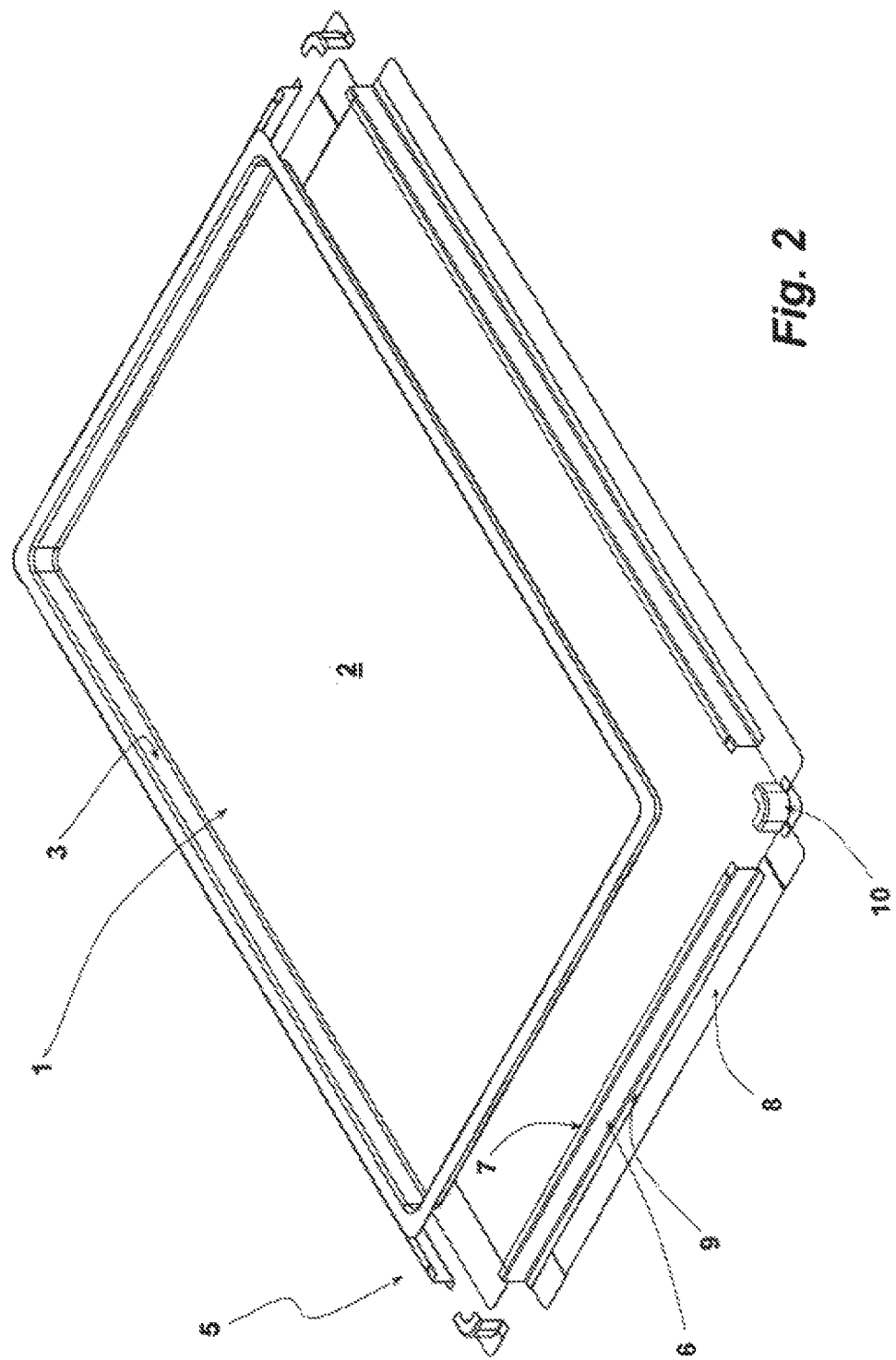
FIG. 2 shows an exploded view of the part y battery se shown in FIG. 1.

The battery case part of FIG. 1 is shown in an exploded view in FIG. 2. The tray part 1 of the illustrated exemplary embodiment is a tray part as is used conventionally. What is special about this battery case part is the configuration of the frame structure 5. The side walls 3 and the mounting flange 4 of the tray part 1 are involved in the formation of the frame structure 5. The frame structure 5 is completed along each side of the tray part 1 by a first frame member 6, which is attached by means of a connecting leg 7 to the underside of the mounting flange 4, and by a second frame member 8, which functions as a closing plate and connects a lower, outwardly bent leg 9 of the frame member 6 to the outer surface of the base 2 of the tray part 1. The frame members 6, 8 are connected to one another via corner connectors 10. Such a corner connector 10 is constructed similarly to the first, straight frame member 6, but is curved over 90° in accordance with the corner formation of the illustrated embodiment.

The configuration of the frame structure 5 is apparent from the cross-sectional view shown in FIG. 3. The side walls 3, mounting flange 4, and frame members 6, 8 enclose a hollow chamber 11. Thus, the side walls 3 and the mounting flange 4 of the tray part 1 are involved in the formation of the desired hollow chamber profile, which encloses tray part 1. In the exemplary embodiment illustrated here, the other two frame members 6, 8 are likewise sheet steel parts, which are connected to one another or to the tray part 1 by means of spot welds.

Although in the figures the frame structure 5 requires two frame members 6, 8 in addition to tray part 1 in order to complete the frame structure 5, it is possible for a coherent, in particular an integrally configured frame member, to be used, which then forms the desired frame structure together with tray part 1.

Figure 4:
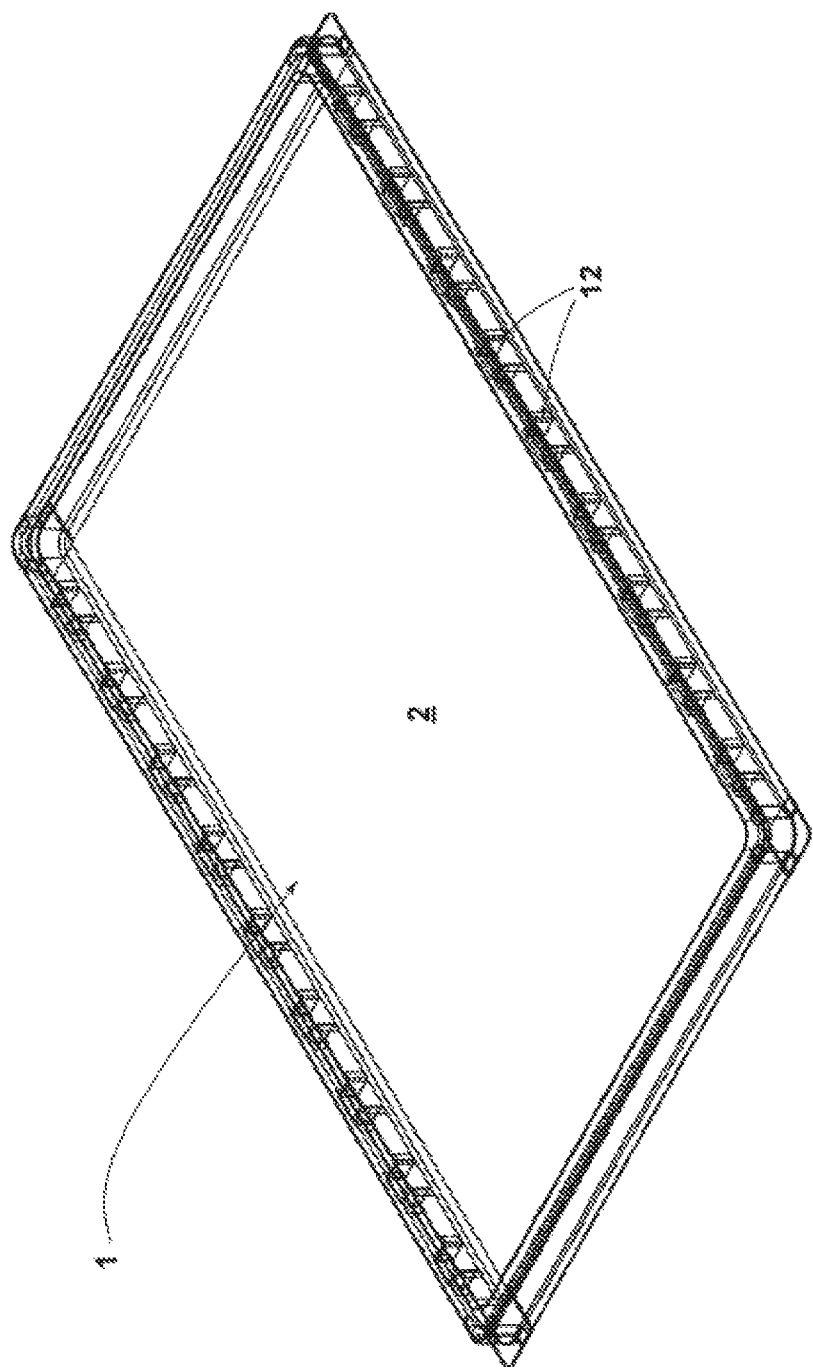
FIG. 4 shows a transparent representation of the part of the battery case shown in FIG. 1, visualizing fixtures contained within the frame structure.

The formation of the peripheral hollow chamber 11 by the connection of at least two parts allows the hollow chamber 11 to be used for fixtures or the like, typically functional elements. In the exemplary embodiment illustrated in the figures, shock absorbing elements 12 are inserted in the hollow chamber 11, specifically in the sections along the longitudinal extension of the tray part 1, and are secured therein on at least one wall (see FIG. 4). In the illustrated exemplary embodiment, the shock absorbing elements 12 are configured as U-shaped profile sections, the leg ends of which point away from one another and serve for attachment to the inner side of the wall 6.1 of the first frame members 6, which connects connecting leg 7 to leg 9. In the exemplary embodiment shown here, these elements 12 are likewise sheet steel parts. In place of such sheet steel parts, aluminum profile sections may be inserted into hollow chamber 11. The shock absorbing direction of these elements 12 points into the plane of the base 2 of tray part 1.

In other embodiments, a plurality of tray parts 1 will be combined to form a tray assembly, in order to provide the desired battery capacity. Such an assembly is shown by way of example in FIG. 5. The tray parts 1.1 are likewise enclosed by a frame structure 5.1, as detailed above in reference to the exemplary embodiment of FIGS. 1 to 4. The feature specific to such a tray assembly, as shown in FIG. 5, is the formation of the frame structure 5.1 between two adjacent tray parts 1.1. Otherwise, these are configured the same as the tray part 1 of the exemplary embodiment described above. Such a section of the frame structure 5.1 is shown in cross-section in FIG. 6. Both of the tray parts 1.1 arranged adjacent to one another are involved in the formation of this section of the frame structure 5.1, specifically the side walls 3.1 and the mounting flanges 4.1 of said tray parts. As is clear from FIG. 6, the side walls 3.1 and the mounting flanges 4.1 of the tray parts 1.1 arranged side by side enclose 75% of the hollow chamber 11.1. To complete this frame structure section, a closing plate 13 that connects the outer surfaces of the bases 2.1 of the adjacent tray parts 1.1 serves as an additional frame member. In the exemplary embodiment illustrated, the two mounting flanges 4.1 of mutually adjacent tray parts 1.1 are connected to one another by a connector plate 16, which is reinforced by beading 14 and by bent edges 15, 15.1. The connector plate 16 is attached to the underside of the mounting flange 4.1 by spot welding. This welding operation is carried out before the closing plate 13 is attached to the undersides of the bases 2.1, likewise by spot welding.

FIG. 7 shows an alternative embodiment of the formation of a connection between two tray parts 1.2 arranged side by side. The side-by-side arrangement of the tray parts 1.2 in the diagram of FIG. 7 differs from the configuration described in reference to FIG. 6 only in that the two mounting flanges 4.2 have a downward bent edge 17 along their mutually facing end regions, so that these bent sections rest against one another. To connect the mounting flanges 4.2 of the adjacent tray parts 1.2, the joint between said bent edges 17 is welded on its end face. In this embodiment, the use of the connector plate 16 of the exemplary embodiment of FIG. 6 can be dispensed with to reduce weight. The hollow chamber 11.2 of this frame structure section is likewise sealed off by a closing plate 13.1.

In this embodiment the outer surface of the side walls of the tray part of the frame structure need not be designed as consistently straight so that a hollow chamber profile can be attached thereto, supported over the length of the side wall, as is required in previous disclosures. This aspect is utilized in the embodiment shown in FIG. 8. FIG. 8 shows a further tray part 1.3, the structure of which is similar in principle to the tray parts 1, 1.1 and 1.2 described above. Tray part 1.3 differs from the tray parts described above in terms of the formation of its corners for connecting two side walls 3.3 arranged adjacent to one another. This corner formation 18 of tray part 1.3 serves to enlarge the usable battery module volume enclosed by tray part 1.3. The usable battery module volume provided by tray part 1.3 is provided by the entire supporting surface of the base 2.3 up to the radius in the transition to the side walls 3.3 molded onto the base 2.3. For this purpose, the center of curvature of the curved edge section 19 involved in the corner formation 18 has been shifted outward and is connected to the adjacent side walls 3.3, in each case with interposition of a connecting wall section 20, 20.1 which is curved in the direction opposite the curvature of the edge section 19. The resulting enlargement of the usable battery volume within tray part 1.3 is possible without a reduction in the radius of curvature of edge section 19. This increases the cost-efficient, production of tray part 1.3 from a sheet steel blank by a deep drawing process, as is the case for the subject of the exemplary embodiment of FIG. 8. This bulging of the corner formations 18 of tray part 1.3 does not adversely affect the formation of the frame structure 5.2 described for the preceding exemplary embodiments. This bulging can be achieved, with the participation of the side walls 3.3 and the mounting flange 4.3, using the same frame members that are used to form the frame structure of the exemplary embodiment of FIGS. 1 to 4.

FIG. 9 shows an assembly of tray parts 21 according to the prior art. The frame structure 22 is composed of a plurality of interconnected hollow chamber profiles. With this self-contained frame structure 22, an integration of fittings into the hollow chamber is not possible. In addition, much more material is used to create the outer peripheral frame than with the subject matter of the described present disclosure. Particularly striking is the weight savings that is achieved with the subject matter of the present disclosure in an assembly involving multiple tray parts. For the embodiment, as shown in FIG. 6, for example, in principle only one additional closing plate is required as an additional frame member to form the frame structure section between two adjacent tray parts, in previous disclosures a complete hollow chamber profile had been used between two tray parts.

The present disclosure has been described in the context of embodiments. Numerous other options for implementing the present disclosure within the scope of the asserted claims will be apparent to a person skilled in the art, without thereby departing from the scope of the asserted claims.

LIST OF REFERENCE SIGNS 1, 1.1, 1.2, 1.3 tray part
2, 2.1, 2.2, 2.3 base
3, 3.1, 3.2, 3.3 side wall
4, 4.1, 4.2, 4.3 mounting flange
5, 5.1, 5.2 frame structure
6 first frame member
6.1 wall
7 connecting leg
8 closing plate
9 leg
10 corner connector
11, 11.1, 11.2 hollow chamber
12 shock absorbing element
13, 13.1 closing plate
14 beading
15 downward bent edge
16 connector plate
17 downward bent edge
18 corner formation
19 curved edge section
20, 20.1 connecting wall section
21 tray part
22 frame structure

The invention claimed is:
1. A battery case for a vehicle driven by an electric motor, comprising:
 a tray part, which has a base onto which side walls having a peripheral, outwardly directed mounting flange are molded, and
 a structure with an open chamber, which surrounds the tray part outside of its side walls;
 wherein, together with the structure, the side walls and the mounting flanges of the tray part form a hollow frame structure enclosing a hollow chamber, whereas the side walls separate the tray interior from the hollow chamber of the frame structure, and wherein the frame structure comprises, besides the side wall and mounting flange of the tray part, at least two additional frame members of the structure surrounding the tray part being connected to the tray part for completing the frame structure, of which a first frame member has a first leg opposite and with distance to the side wall of the tray part, and an upper terminating second leg connected to the mounting flange of the tray part, the first leg opposite the side wall delimiting the hollow chamber is arranged outside of an outer termination of the mounting flange, and of which a second frame member is a closing plate that connects the first frame member to an underside of the tray part.

2. The battery case of claim 1, wherein the closing plate is fixed to the outer surface of the base of the tray part.

3. The battery case of claim 2, wherein the tray part is provided as more than one tray part surrounded by the structure, and to form a hollow frame structure in between adjacent tray parts, the side wall of one tray part arranged adjacent to another tray part is provided as an additional frame member.

4. The battery case of claim 2, wherein the at least two additional frame members are configured as one coherent frame member.

5. The battery case of claim 2, wherein the at least two additional frame members that serve to complete the frame structure are straight sections connected to one another by corner connectors.

6. The battery case of claim 2, wherein adjacent side walls of the tray part are connected to one another by a curved edge section, wherein each curved edge section of the tray part is connected to at least one of the side walls with the interposition of a connecting wall section which is curved in a direction opposite the curved edge section.

7. The battery case of claim 6, wherein both of the side walls connected by a curved edge section are connected to the curved edge section with the interposition of a connecting wall section which is curved in a direction opposite the curved edge section.

8. The battery case of claim 2, wherein the at least one additional frame member is or at least comprises a molded sheet metal part.

9. The battery case of claim 1, wherein the tray part is provided as more than one tray part surrounded by the structure, and to form a hollow frame structure between adjacent tray parts, the side wall of one tray part arranged adjacent to another tray part is provided as an additional frame member.

10. The battery case of claim 9, wherein the adjacent tray parts each have, at least along their adjacent surfaces, outwardly projecting mounting flanges, which are connected to one another by a connector plate.

11. The battery case of claim 1, wherein the at least two additional frame members are configured as one coherent frame member.

12. The battery case of claim 1, wherein the at least two additional frame members that serve to complete the frame structure are straight sections connected to one another by corner connectors.

13. The battery case of claim 1, wherein additional components are connected to the frame structure.

14. The battery case of claim 1, wherein one or more functional elements are inserted and secured in the hollow chamber of the frame structure.

15. The battery case of claim 14, wherein the functional elements are shock absorbing elements, which are arranged with respect to their shock absorbing direction transversely to a longitudinal extension of the hollow chamber and toward the tray part.

16. The battery case of claim 14, wherein reinforcing elements are inserted as functional elements into the hollow chamber.

17. The battery case of claim 1, wherein adjacent side walls of the tray part are connected to one another by a curved edge section, wherein each curved edge section of the tray part is connected to at least one of the side walls with the interposition of a connecting wall section which is curved in a direction opposite the curved edge section.

18. The battery case of claim 17, wherein both of the side walls connected by a curved edge section are connected to the curved edge section with the interposition of a connecting wall section which is curved in a direction opposite the curved edge section.

19. The battery case of claim 1, wherein the tray part is a metal part deep-drawn from a sheet metal blank.

20. The battery case of claim 1, wherein the at least one additional frame member is or at least comprises a molded sheet metal part.

* * * * *